3,408,437
MOLDING THERMOPLASTIC PRINTING PLATES
John B. Wheeler III, Somerville, John Sonia, Califon, Herbert Samuels, Somerville, and James G. Kirkis, Highland Park, N.J., assignors to Union Carbide Corporation, a corporation of New York
No Drawing. Continuation-in-part of application Ser. No. 566,465, July 20, 1966. This application Oct. 23, 1967, Ser. No. 677,053
14 Claims. (Cl. 264—226)

ABSTRACT OF THE DISCLOSURE

Process for forming thermoplastic printing plates and the like by forming a thermoplastic matrix against an original pattern from a thermoplastic material having a HDT at 264 p.s.i. of at least about 65° C., backing the thus formed matrix with a heat sink, thereafter forcing against said matrix a hot, formable thermoplastic material at a temperature above its softening temperature, said temperature being above but not greater than about 172° C. above the HDT of the matrix, cooling the hot thermoplastic material below its softening temperature and the HDT of the matrix, and separating the thus formed printing plate from the matrix.

---

This application is a continuation-in-part of copending application Serial No. 566,465, filed July 20, 1966, now abandoned.

This invention relates to molding thermoplastic printing plates, sound records and the like against a thermoplastic matrix at temperatures greater than the heat distortion temperature of the matrix. This invention also relates to the molding of such plates against a curved matrix to directly produce a curved thermoplastic printing plate.

In the copending applications of John B. Wheeler III, Ser. No. 365,797, filed May 7, 1964, and Ser. No. 474,504, filed July 23, 1965, it is disclosed that certain polyarylene polyethers can be utilized as a thermoplastic matrix against which thermoplastic printing plates can be compression molded from pellets or preformed sheet of the thermoplastic material at temperatures not exceeding the heat distortion temperature (herein referred to as HDT) at 264 p.s.i. (ASTM D648–56) of the polyarylene polyether matrix without undergoing thermal and/or dimersional degradation. These polyarylene polyethers are melt fabricable thermoplastic materials having thermal properties that render them especially suited as matrix materials. Other melt fabricable thermoplastic materials are generally not suited for use as a matrix material because of their generally poor thermal properties, i.e., low heat distortion temperatures.

Contrary to what might be expected, it has now been discovered that thermoplastic materials having HDT's at 264 p.s.i. as low as about 65° C. can successfully be formed into a matrix against which duplicate thermoplastic printing plates can be molded without distortion or degradation.

Broadly the process of this invention for forming thermoplastic printing plates and the like comprises forming a thermoplastic matrix against an original pattern from a thermoplastic material having a HDT at 264 p.s.i. of at least about 65° C., preferably at least about 130° C., backing the thus formed matrix with a heat sink maintained at a temperature not greater than about 25° C. in the case of a matrix having a HDT of less than about 130° C. and not greater than about 110° C. in the case of a matrix having a HDT of greater than about 130° C., thereafter forcing against said matrix a hot, formable thermoplastic material at a temperature above its softening temperature but not greater than about 172° C., preferably not greater than about 100° C., above the HDT of the matrix, with the proviso that where the temperature of the hot thermoplastic material is above the HDT of the matrix, the thermoplastic material has a melt flow (ASTM D1238–57T) at that temperature of not less than 0.3 decigram per minute, cooling the hot thermoplastic material below its softening temperature and the HDT of the matrix, and separating the thus formed printing plate from the matrix.

In an alternate embodiment the matrix is backed with a curved heat sink thereby directly producing curved printing plates.

Thus the present invention provides a method whereby conventional, low cost thermoplastic materials can be used to rapidly and faithfully produce one or more duplicate thermoplastic printing plates.

Thermoplastic materials having a HDT at 264 p.s.i. of at least about 65° C. that can be formed into matrices for us in this invention include polyarylene polyethers, polypropylene, acrylonitrile-butadiene-styrene (ABS) copolymers, polyhydroxyethers, impact polystyrene, styrene-acrylonitrile copolymers, polycarbonates, poly-4-methyl pentene-1, and the like.

Preferred matrices are formed from linear thermoplastic polyarylene polyethers having a basic structure composed of recurring units having the formula

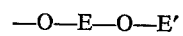

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms as described in said copending application Ser. No. 365,797. The foregoing polyarylene polyethers and their preparation are described in detail in Belgian Patent 650,476.

Other matrices can be formed from thermoplastic polyarylene polyether composed of recurring units having the formula

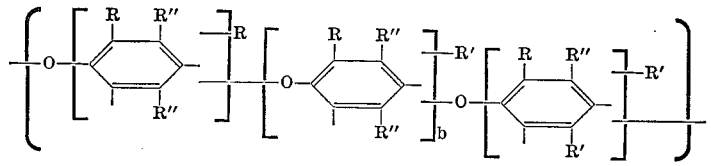

wherein the free valence of the terminal oxygen atom of one unit is connected to the free valence of the terminal benzene nucleus of the adjoining unit, $b$ is an integer of from 0 to 1, inclusive, R is a monovalent substituent selected from the group of hydrocarbon radicals, halohydrocarbon radicals having at least 2 carbon atoms, R' and R'' are the same as R and in addition hydrogen, said matrix exhibiting uniform mold shrinkage in all directions of 0.7% and less, and characterized by being thermally and dimensionally stable at molding temperatures of up to 350° F. as described in said copending application Ser. No. 474,504. The foregoing polyarylene polyethers and their preparations are described in U.S. Patent 3,134,753.

Polyhydroxyethers are substantially linear polymers having the general formula

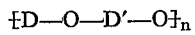

wherein D is the radical residuum of a dihydric phenol, D' is a hydroxyl containing radical residuum of an epoxide and $n$ represents the degree of polymerization and is at least 30 and is preferably 80 or more. Thermoplastic polyhydroxyethers and the preparation are described in U.S. Patent 3,245,865.

Suitable polycarbonates have recurring structural units of the formula

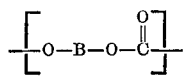

wherein B is a divalent aromatic radical of a dihydric phenol.

Matrices used in the present invention are generally formed by contacting pellets or a sheet of thermoplastic material described herein with an original pattern such as an engraved original or a type form, applying heat and pressure, separating the matrix and original and allowing the matrix to cool. Excellent reproduction of the original is obtained in the matrix against which true duplicates of the original can be molded as described infra.

The temperature at which a matrix can be formed is not narrowly critical. Obviously, the lowest temperature will be the temperature at which the thermoplastic material can be formed under pressure, and the highest temperature will be below the decomposition temperature of the polymer or softening point of the original pattern. Matrices can be formed from unmounted copper engravings, from unmounted zinc and magnesium engravings and from type metal, such as Linotype metal which softens under pressure at about 440° F. Molding pressure can vary widely. Useful pressures range from 200 p.s.i. to 1,000 p.s.i., preferably from 250 p.s.i. to 500 p.s.i. Specific examples of suitable techniques for forming a matrix of the present invention are detailed in the example below.

For purposes of the present invention, it is preferred to employ matrices having thickness within the range of from about 30 to about 120 mils to insure good heat transfer to the heat sink during the plate molding operation.

Polymeric material that can be molded against the matrix according to the present invention to produce printing plates and the like are normally solid thermoplastic materials having softening temperatures (e.g., melt forming temperatures) not greater than about 172° C. above the HDT of the matrix. Suitable thermoplastic materials include polyolefins such as polyethylene and polypropylene, polyvinylidene chloride, polyvinyls, ABS, polystyrene, styreneacrylonitrile copolymers, polyacrylates, polymethacrylates, polyamides, polycarbonates, polyhydroxyethers, polyarylene polyethers, polyoxymethylenes, copolymers and mixtures of the foregoing and the like.

Thermoplastic material moldable against the matrix of the present invention can contain any well known additive such as fillers, dyes, pigments, cross-linking agents, curing agents, stabilizers, plasticizers, preservatives, lubricants, antioxidants, and the like. However, polymeric molding formulations should not contain solvents or other materials which attack the thermoplastic matrix. In general, any component which is inert with respect to the matrix and the polymer molded against the matrix can be included in a molding formulation.

In general, the matrix separates readily from an original pattern or duplicate plate or the like without the aid of a mold release agent. However, if desired, mold release agents can be used to effect separation between the matrix and original or duplicate member. Suitable mold release agents are graphite, molybdenum disulfide, silicone oils, and the like. The use of solvents or agents which attack the matrix material should be avoided.

The hot, formable thermoplastic material can be forced against the matrix to form duplicate members in three ways: injecting the hot thermoplastic material into a mold cavity formed by the matrix and a confining member which defines the shape of the desired duplicate article with the matrix under sufficient pressure to fill the mold cavity and duplicate the matrix surface; injecting a mass of hot thermoplastic material and placing it on the matrix and rapidly compression molding this mass to conform to the matrix in the shape of the desired duplicate article; and extruding a mass of hot thermoplastic material and placing it on the matrix and rapidly compression molding this mass to conform to the matrix in the shape of the desired duplicate article.

By way of explanation, it is believed that the use of a matrix backed with a heat sink as described previously permits rapid dissipation of the heat possessed by a hot mass of thermoplastic material when it is injected or placed on the surface of the matrix. This rapid heat transfer prevents distortion or degradation of the matrix and allows the molding of a plurality of duplicate articles without distortion or degradation of the matrix. In compression molding against a matrix using preheated sheet or pellets, it is not possible to mold at temperatures exceeding the HDT of the matrix without distorting or degrading the matrix. In the present invention, it has been found that the use of a hot, formable mass of thermoplastic material permits molding a mass at a temperature above the HDT of the matrix without distortion.

In practice, the heat sink employed is a metal mold in which the matrix is clamped and is provided with cooling means to maintain the temperature within the limits described previously. The other half of the mold, also provided with cooling means, is adapted to cooperate with the surface of the clamped matrix to define the shape of the desired duplicate printing plate and the like. The other half of the mold and the matrix then can define the mold cavity into which a hot mass of thermoplastic material is injected or it can be used to compress an injected or extruded hot mass placed on the matrix into conformity with the matrix in the desired shape for the printing plate or the like.

In a preferred embodiment, the matrix is clamped in a concave mold which acts as the heat sink and the other half of the mold cooperates with the matrix surface to define a convex printing plate. In this manner, curved duplicate thermoplastic printing plates can be produced directly thereby avoiding distortions in the plate surface which otherwise occur when a plate is molded flat and later curved.

In a preferred embodiment, thermoplastic matrices are molded flat from unmounted zinc, copper, or magnesium engravings or from a typeform containing lead type and mounted engravings by any convenient means such as compression molding of pellets or sheets of polypropylene, styrene-acrylonitrile copolymer, polyhydroxyether, styrene-acrylonitrile-butadiene terpolymer, polycarbonate, and polyarylene polyether. Matrices are cut to 10¼" x 15⅜" and have 0.090" thickness in non-image areas and 0.060" in the image areas. Each of these matrices is inserted in a curved, matched metal mold with recesses to receive it and clamped in place. A 2" vertical extruder with breaker plate is used to plasticize the thermoplastic plate materials at temperatures within the limits indicated herein. Measured masses of resin weighing 0.3 to 0.4 pound are extruded and transferred to the open plate mold which is then closed and maintained with about 700 p.s.i. pressure on the mold from 45 seconds to 60 seconds to cool and harden the plate. Successive plates are turned out in as little time as one minute per plate, including 20 seconds to extrude the mass, 5 seconds to transfer it to the mold, 25 seconds to close and cool the mold and 10 seconds to open the mold and strip the finished plate. In this embodiment the mold has a curvature with a radius of 6⅝" so that when the plates are molded they match the cylinder of a tabloid newspaper press. The mold is fitted with channels so that first steam or warm water and then cold water can be cycled through it. The mold is then installed in a hydraulic press capable of exerting fifty-six tons pressure. Since the plate size is 10¼" x 15⅜", the press exerts 710 p.s.i. on the plate during molding. By this method successive plates are all cast to the same curvature. The matrix can be inserted in a mold with a different curvature (or a flat one) and a new set of plates made from it, a degree of flexibility not available in previously known means of molding plastic printing plates.

The following examples are intended to further illustrate the present invention without limiting same.

EXAMPLE 1

Six sets of thermoplastic matrices were molded flat from a 0.065" thick magnesium photo engraving 12" x 16" in size, using a cycled hydraulic press. Matrices had floor thicknesses of about 0.065" and nonimage thicknesses of about 0.095". Molding conditions are shown in Table I. All molds were cooled under pressure to below the heat distortion temperatures before stripping from the original.

All matrices were perfect negative reproductions of the original material in the photoengraving.

TABLE I

| Thermoplastic Matrix Material | Matrix Molding Temp., °C. | Molding Pressure, p.s.i. | Preheat Time, min. | Time Under Pressure, min. | 264 p.s.i. Heat Distortion Temp., °C. | Softening Temp., °C. |
|---|---|---|---|---|---|---|
| Bisphenol A Polycarbonate | 215 | 1,000 | 3 | 1 | 132 | 150 |
| ABS | 177 | 1,000 | 3 | 1 | 91 | 110 |
| Bisphenol A Polyhydroxyether | 163 | 1,000 | 3 | 1 | 85 | 104 |
| Polypropylene | 215 | 1,000 | 3 | 1 | 66 | 168 |
| Styrene-acrylonitrile Copolymer | 188 | 1,000 | 3 | 1 | 91 | 104 |
| Polyarylene polyether* P-1700 (UCC) | 246 | 1,000 | 3 | 1 | 176 | 190 |
| Poly-4-methyl pentene-1 | 246 | 1,000 | 3 | 1 | 70 | 215 |

*Composed of recurring units having the formula—

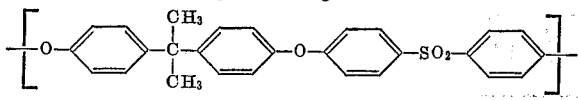

from bisphenol A and 4,4'-dichlorodiphenylsulfone in dimethyl sufoxide.

EXAMPLE 2

The polycarbonate matrices made as in Example 1 were trimmed to 10¼" x 15⅜" and inserted into a curved cavity mold, having a radius of 6⅝". The mold was fitted with a clamp which could be screwed into place to hold the matrix in position. This mold combination was then placed in a hydraulic press capable of exerting 700 to 1,000 p.s.i. on the plate area. The cavity mold was connected to sources of steam and cold water with a quick-throw four-way valve so that the mold could be quickly cycled from hot to cold or vice versa as desired. The plate molding resin was plasticized in a vertical 2" Egar extruder manufactured by Aragon Products Company, of Newark, New Jersey. Polypropylene, low density polyethylene, styrene-acrylonitrile copolymer and a vinyl printing plate compound, R9400, manufactured by Williamson and Company, was extruded into molten masses of approximately ⅓ pound each. They were then inserted in the mold, the mold closed with 1,000 p.s.i. pressure for forty-five to sixty seconds, till the plate solidified, then opened and the completed curved plate removed, ready to be fastened on a printing press after shaving to insure accurate printing thickness. Mold temperatures were maintained as shown in Table II below. The number of good plates made from each matrix is indicated in the table. The method of judging failure was to measure for any dimensional changes, and to check the half-tone dots for any flow or distortions. For many classes of printing small distortions in the printing image would not be disabling, as for instance in line work or typeforms.

All experiments were conducted with silicone oil mold release on the matrix.

TABLE II

| Plate Material | Stock Temp., °C. | Melt Flow[3] At Stock Temp., dg./min. | Mold Temp., °C. | Number of Plates Molded Before Matrix Failed |
|---|---|---|---|---|
| Polypropylene[1] | 246 | 10.8 | 65 | >10 |
| Polyethylene[2] | 232 | 4.48 | 30 | >10 |
| Styrene-acrylonitrile copolymer | 232 | 3.66 | 30 | 3 |
| Vinyl Compound R9400 | 163 | 0.35 | 30 | >11 |

[1] Melt Flow 7 decigrams per minute, ASTM D1238-57T same for all examples.
[2] Melt Index 2 decigrams per minute, ASTM D1238-57T same for all examples.
[3] ASTM D1238-57T same for all examples.

Thus, although the temperature of the extruded mass of plate material was from 31°–114° C. higher than the heat distortion temperature of the polycarbonate matrix, no damage resulted to the matrix.

EXAMPLE 3

The ABS matrices, made as in Example 1, were processed and clamped in the cavity mold as in Example 2. The same plate molding procedure was followed with results shown in Table III.

TABLE III

| Plate Material | Stock Temp., °C. | Melt Flow at Stock Temp., dg./min. | Mold Temp., °C. | Number of Plates Molded Before Matrix Failed |
|---|---|---|---|---|
| Polypropylene | 246 | 10.8 | 43 | 11 |
| Polyethylene | 204 | 2.23 | 30 | 9 |
| Do | 232 | 4.48 | 30 | 2 |
| Vinyl Compound: | | | | |
| R9400 | 163 | 0.35 | 30 | 3 |
| R9400 | 177 | 1.42 | 30 | 1 |

Thus, for every combination at least one good plate is possible. This example demonstrates that the melt temperature of the plate material can run from 72–155° C. higher than the heat distortion temperature of the ABS, depending on the melt flow of the plate material.

EXAMPLE 4

The polyhydroxyether matrices, made as in Example 1, were processed and clamped in the cavity mold as in Example 2. The same plate molding procedure was followed with results shown in Table IV.

TABLE IV

| Plate Material | Stock Temp., °C. | Melt Flow at Stock Temp., dg./min. | Mold Temp., °C. | Number of Plates Molded Before Matrix Failed |
| --- | --- | --- | --- | --- |
| Polypropylene | 246 | 10.8 | 30 | 1 |
|  | 246 | 10.8 | 10 | 2 |
| Ethylene/ethyl acrylate copolymer [1] (15% ethyl acrylate) | 149 | 1.81 | 30 | >10 |
| Polyethylene | 163 | 0.72 | 30 | 10 |
|  | 138 | 0.35 | 30 | 6 |

[1] Melt Flow 6 decigrams per minute, ASTM D1238-57T same for all examples.

Thus, at least one good plate was possible at melt temperatures ranging from 36–161° C. higher than the heat distortion temperature of the matrix.

EXAMPLE 5

The styrene-acrylonitrile matrices, made as in Example 1, were processed and clamped in the cavity mold as in Example 2. The same plate molding procedure was followed with results shown in Table V.

TABLE V

| Plate Material | Stock Temp., °C. | Melt Flow at Stock Temp., dg./min. | Mold Temp., °C. | Number of Plates Molded Before Matrix Failed |
| --- | --- | --- | --- | --- |
| Polypropylene | 246 | 10.8 | 30 | 1 |
| Do | 246 | 10.8 | 10 | 2 |
| Ethylene/ethyl acrylate copolymer (15% ethyl acrylate) | 149 | 1.81 | 30 | >10 |
| Polyethylene | 232 | 4.48 | 30 | 2 |

At least one good plate was made for each combination at melt temperatures from 58°–155° C. above the heat distortion temperature of the matrix.

EXAMPLE 6

The polypropylene matrices, made as in Example 1, were processed and clamped in the cavity mold as in Example 2. The same plate molding procedure was followed with results as in Table VI.

TABLE VI

| Plate Material | Stock Temp., °C. | Melt Flow at Stock Temp., dg./min. | Mold Temp., °C. | Numbers of Plates Molded Before Matrix Failed |
| --- | --- | --- | --- | --- |
| Polyethylene | 232 | 4.48 | 30 | 1 |
|  | 204 | 2.23 | 30 | 6 |
| Vinyl Compound D R9400 | 163 | 0.35 | 30 | >5 |
| Ethylene/ethyl acrylate copolymer (15% ethyl acrylate) | 149 | 1.81 | 30 | 9 |

At least one good matrix was molded for each combination at temperatures from 83°–166° C. above the heat distortion temperature of the matrix material.

EXAMPLE 7

A poly-4-methyl pentene-1 matrix, molded as in Example 1, was processed and clamped in the cavity mold as in Example 2. The same plate molding procedure was followed, using the vinyl printing plate compound R9400, with a melt temperature of 163° C. and a melt flow at that temperature of 0.35 decigrams/min. More than five plates were molded without any sign of damage to the matrix although the melt temperature was 93° C. higher than the heat distortion temperature of the matrix.

EXAMPLE 8

The polyarylene polyether matrices, made as in Example 1, were processed and clamped in the cavity mold as in Example 2. The same molding procedure was followed with results as in Table VII.

TABLE VII

| Plate Material | Stock Temp., °C. | Melt Flow at Stock Temp., dg./min. | Mold Temp., °C. | Number of Plates Molded Before Matrix Failed |
| --- | --- | --- | --- | --- |
| Polypropylene | 245 | 6.00 | 65 | >100 |
| Do | 260 | 8.25 | 65 | >18 |
| Polyethylene | 232 | 4.48 | 65 | >40 |
| Vinyl Compound R9400 | 163 | 0.38 | 65 | >10 |

Large numbers of plates can be successfully molded from these matrices at melt temperatures from 56–84° C. above its heat distortion temperature. The vinyl compound was actually molded with a stock temperature 13° C. lower than the heat distortion temperature of the matrix.

EXAMPLE 9

Polyarylene polyether matrices, made as in Example 1, were processed and clamped in the cavity mold as in Example 2. The molding procedure was a lower pressure injection molding process. The equipment functioned as follows. A 3½″ Egan extruder charged an accumulating cylinder on a continuous basis. When the cylinder had been charged with 0.33 to 0.40 pound of molten plate material the accumulator was triggered and injected the melt into the mold under 3,000 p.s.i. pressure with the mold closed. The gate was positioned directly over the center of the matrix at a distance of from ⅛″ to ⅜″ above its surface when the mold was closed. The injection-compression process was a variation of this procedure in which the mold was stopped ⅛″ to 1½″ short of the closed position. The injection shot was made and the mold then closed the rest of the way. The mold was fitted to be cycled with hot or cold water as desired. Molding pressure was 700 p.s.i. Table VIII shows the results of molding several plate materials at various melt temperatures.

radiation could not soften the matrix. The sandwich was heated for 1½ minutes to about 138° C. (giving a printing plate material melt flow of 1.65 at that temperature). This sandwich was then transferred to the molding press with platens at 30° C. and pressed for 1½ minutes until cool enough to strip. A perfectly formed printing plate resulted with no damage to the matrix. Six more perfect plates were formed by this method with no damage to the matrix resulting.

TABLE VIII

| Plate Material | Stock Temp., °C. | Position of Mold When Shot Delivered | Distance of Gate to Matrix Inches¹ | Mold Temp., °C. | Number of Plates Molded Before Matrix Failure |
|---|---|---|---|---|---|
| Polyethylene | 268 | Closed | ¼ | 38 | 7 |
| (Melt index 0.2) | 268 | do | ⅛ | 38 | 1 |
| Polyethylene (Melt index 0.2) | 232 | do | ¼ | 24 | >20 |
| ABS | 232 | do | ¼ | 65 | >20 |
| High Density Polyethylene | 221 | Open | ⅜ | 43 | >28 |
| Polypropylene | 235 | do | 1 | 43 | >40 |
| Bisphenol A Polyhydroxyether | 232 | do | ½ | 43 | >10 |

¹ The gate was directly over the center of the image area on the matrix.

EXAMPLE 10

An 8″ x 10″ original etching, serving as the pattern, was placed on the lower platen of a hydraulic press at 30° C. A piece of 0.125″ thick impact polystyrene sheet having a 264 p.s.i. heat distortion temperature of 88° C. was heated in an infrared radiant glass panel oven to approximately 177° C. in five minutes. The melted sheet was then transferred to a hydraulic molding press and placed on top of the original and the press immediately closed under 500 p.s.i. pressure to fill out and reproduce all the detail therein. After 1½ minutes cooling, the press was opened and a perfectly formed negative reproduction stripped from the original.

One third pound of granules of ethylene/ethyl acrylate copolymer (melt flow 6 decigrams/min. 15% ethyl acrylate) were placed on a suitable carrying sheet and heated in the infrared radiant heat oven for 2½ minutes, reaching a temperature about 177° C. with a corresponding melt flow of 4.2 at that temperature. The sheet carrying the melted resin was transferred to the hydraulic press with platens at room temperature, about 30° C. The impact polystyrene matrix, also at room temperature, was placed face down on the melted resin, and the press closed with approximately 500 p.s.i. on it. After 1½ minutes cooling, a printing plate was removed having a perfect reproduction of the details in the matrix. No damage to the matrix resulted.

The plate molding procedure was repeated twelve times in succession using the same impact polystyrene matrix without causing any distortion to the half-tone dots or any dimensional changes to it.

EXAMPLE 11

An 8″ x 10″ original and a sheet of 0.125″ thick ABS polymer, having a heat distortion temperature of 91° C. 264 p.s.i., were placed together in the infrared radiant oven with the ABS sheet on top of the original. This sandwich was heated in four minutes to about 177° C. and then transferred to a hydraulic press with platens at 30° C., where it was pressed and cooled in 1½ minutes at 500 p.s.i. A matrix with a perfect negative reproduction of the original resulted. The matrix was trimmed to 8″ x 10″.

A sheet of ethylene/ethyl acrylate copolymer (as described in Example 10) 0.100″ thick with dimensions 8½″ x 10½″ was placed on top of the matrix and inserted into the infrared oven in such a way that the plate material entirely covered the matrix material so that the

We claim:
1. Process for forming thermoplastic printing plates and the like which comprises forming a thermoplastic matrix against an original pattern from a thermoplastic material having a HDT at 264 p.s.i. of at least about 65° C., backing the thus formed matrix with a heat sink maintained at a temperature not greater than about 25° C. in the case of a matrix having a HDT of less than about 130° C. and not greater than about 110° C. in the case of a matrix having a HDT of greater than about 130° C., thereafter forcing against said matrix a hot, formable thermoplastic material at a temperature above its softening temperature, said temperature being above but not greater than about 172° C. above the HDT of said matrix with the proviso that with the temperature of said hot thermoplastic material above the HDT of said matrix, said thermoplastic material has a melt flow at that temperature of not less than 0.3 decigram per minute, cooling the hot thermoplastic material below its softening temperature and the HDT of the matrix, and separating the thus formed printing plate from the matrix.

2. Process of claim 1 wherein said matrix is formed from a thermoplastic material having a HDT of at least about 130° C.

3. Process of claim 1 wherein said hot thermoplastic material is at a temperature not greater than about 100° C. above the HDT of said matrix.

4. Process of claim 1 wherein said matrix is concave and the printing plate produced is convex.

5. Process of claim 1 wherein said hot thermoplastic material is injected against said matrix.

6. Process of claim 1 wherein said hot thermoplastic material is injected and compressed against said matrix.

7. Process of claim 1 wherein said hot thermoplastic material is extruded and compressed against said matrix.

8. Process of claim 1 wherein said matrix is formed from a polyarylene polyether.

9. Process of claim 1 wherein said matrix is formed from polycarbonate.

10. Process of claim 1 wherein said matrix is formed from thermoplastic polyhydroxyether.

11. Process of claim 1 wherein said matrix is formed from acrylonitrile-butadiene-styrene copolymer.

12. Process of claim 1 wherein said matrix is formed from polypropylene.

13. Process of claim 1 wherein said matrix is formed from styrene-acrylonitrile copolymer.

14. Process of claim 1 wherein said matrix is formed from poly-4-methyl pentene-1.

References Cited

UNITED STATES PATENTS

| | | | |
|---|---|---|---|
| 445,932 | 2/1891 | Murnane | 264—220 |
| 1,377,501 | 5/1921 | Novotny | 264—226 |
| 2,028,710 | 1/1936 | Swan et al. | 264—219 |

FOREIGN PATENTS 650,476  1/1965  Belgium.

JAMES A. SEIDLECK, *Primary Examiner.*

J. R. THURLOW, *Assistant Examiner.*